United States Patent Office 3,458,929
Patented Aug. 5, 1969

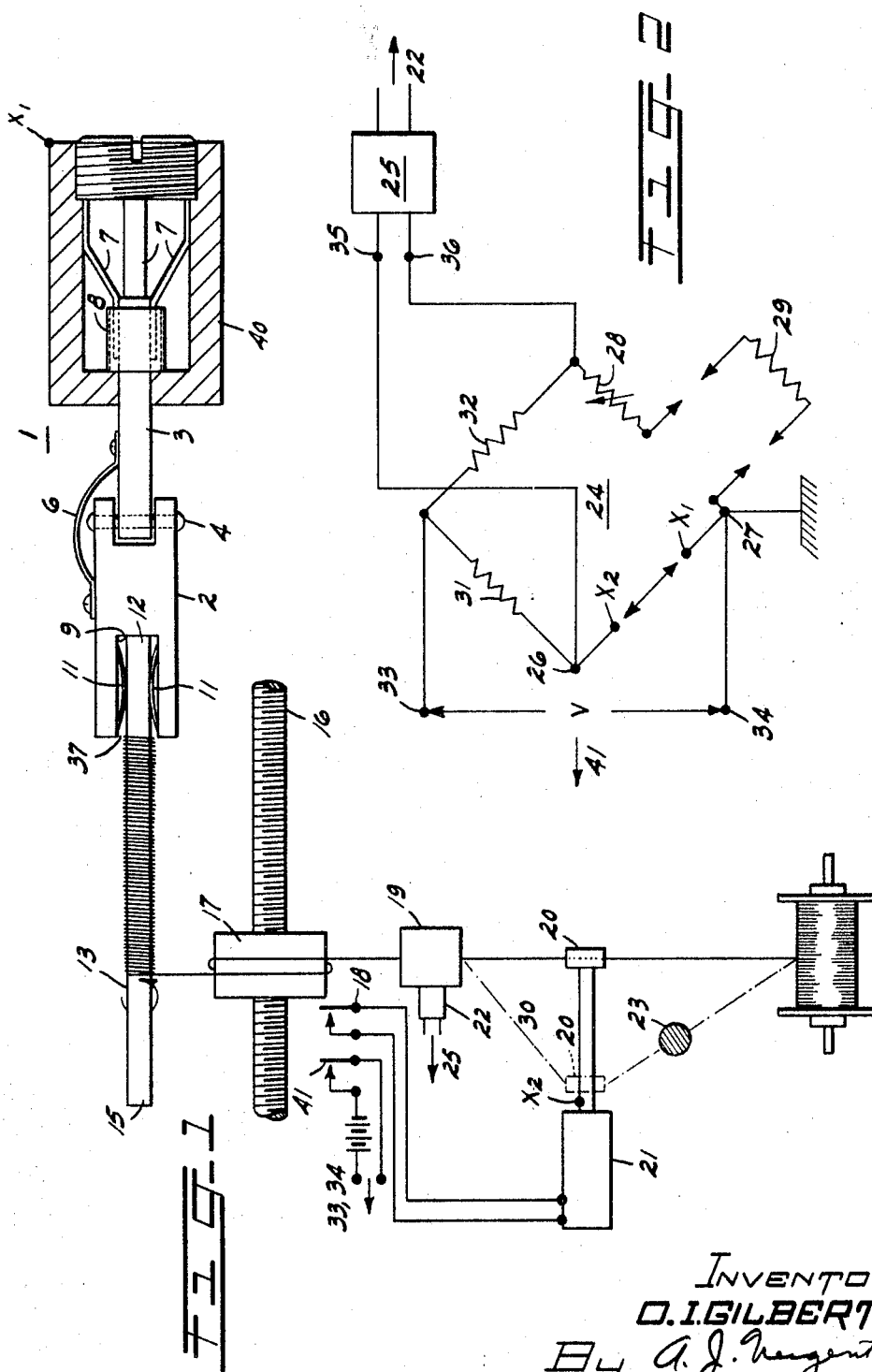

3,458,929
METHOD OF WINDING AND CALIBRATING
ELECTRICAL COILS
Oswald I. Gilbertson, Nutley, N.J., assignor to Western
Electric Company, Incorporated, New York, N.Y., a
corporation of New York
Original application Feb. 26, 1962, Ser. No. 175,633, now
Patent No. 3,302,897, dated Feb. 7, 1967. Divided
and this application Dec. 30, 1966, Ser. No. 624,105
Int. Cl. B65h 81/06
U.S. Cl. 29—605                                    7 Claims

ABSTRACT OF THE DISCLOSURE

The present disclosure embraces a method of winding electrical coils having a predetermined magnitude of an electrical property, such as resistance or inductance, which comprises the following steps: winding a moving wire about a core, connecting measuring facilities to the moving wire at a point in advance of the core only when almost the required number of turns have been wound, severing the wire when the predetermined magnitude is measured by the measuring facilities and continuing to wind the wire on the core until the severed end is reached.

CROSS REFERENCES TO RELATED APPLICATIONS

This is a division of my copending application, Ser. No. 175,633, now U.S. Patent 3,302,897.

BACKGROUND OF THE INVENTION

Field of the invention

This invention relates to a method of manufacturing coils and, more particularly, to a method of winding coils to a predetermined magnitude of an electrical property such as resistance or inductance.

Description of the prior art

In general, the methods that have heretofore found employment in the winding of such articles have not proven altogether satisfactory, primarily because of the difficulties inherent therein in providing a finished article calibrated to a degree of accuracy commensurate with the requirements of modern technology. Further, such methods are usually found to necessitate the use of relatively complex and expensive electromechanical systems which prove, in many instances, to be difficult and time consuming to adjust, operate, and maintain. As a result, the cost factor may be held at a high rate.

SUMMARY OF THE INVENTION

It is, accordingly, an object of this invention to provide a method whereby electrical coils may be conveniently wound and concurrently calibrated in a most accurate manner.

It is a further object of this invention to provide a method wherein such winding and calibration may be more rapidly effected than has heretofore been possible.

Another object of the invention is the provision of a method as above of significantly reduced complexity which entails less cost in the fabrication and maintenance thereof than do the methods of the prior art.

Broadly speaking, the present invention embraces a method of winding electrical coils having a predetermined magnitude of an electrical property, such as resistance or inductance, which comprises the following steps: winding a moving wire about a core, connecting measuring facilities to the moving wire at a point in advance of the core only when almost the required number of turns have been wound, severing the wire when the predetermined magnitude is measured by the measuring facilities and continuing to wind the wire on the core until the severed end is reached.

The details and the above and other objects and advantages of the invention are believed made clear by reference to the accompanying drawings.

BRIEF DESCRIPTION OF THE DRAWINGS

FIG. 1 indicates diagrammatically one type of apparatus for performing the method of the invention; and FIG. 2 is a schematic diagram of an electrical measuring and control circuit associated with the apparatus of FIG. 1.

DETAILED DESCRIPTION

Turning now to FIG. 1 of such drawings, the apparatus for performing the method of the invention is seen to comprise a rotating contact winding arbor, generally indicated at 1 and consisting of an electrically conductive resistor support member 2 and an electrically conductive brush support member 3, mechanically and electrically connected in the manner shown by pin 4 and electrically conductive strap 6.

Three spring contact brushes 7, preferably of beryllium copper, and mounted 120° apart, are fixedly attached to and maintained in contact with the brush support member 3 by the surface pressure of collar 8 mounted thereover. A notch 9, including two contact springs 11, preferably of beryllium copper, positioned therein, is formed in the end of the resistor support member remote from the brush support member.

Conductive bridging 12 of resistor core 13 is inserted within the said notch and maintained therein by the pressure of the said contact springs positioned therebetween. Spring contact brushes 7, collar 8, and the end of brush support member 3 to which same are affixed, are mounted with rotational freedom within the interior of stationary hollow contact member 40 in the manner shown, with the said brushes in surface contact with the interior walls of the stationary contact member to maintain a positive electrical contact therebetween as the brushes are rotated therewithin. Means for applying rotational power, not shown, are utilized adjacent end 15 of the resistor core to rotate the core and winding arbor assembly within the stationary contact member to thus effect winding of the wire drawn from a supply spool 5 about the core.

Lead screw 16 is positioned adjacent the winding arbor assembly with the axes thereof parallel. Lead screw guide 17 is rotatably mounted on the lead screw and movable therealong by the progress of the wire around the screw as the wire is wound about the core 13. Solenoid-actuated cutter 19 and retractable solenoid-controlled wire guide and contact 20 are positioned in the path of the wire as shown, with the former operative upon the actuation of the solenoid 22 associated therewith to sever the wire at the appropriate time, and the latter reciprocably mounted within the solenoid 21 associated therewith and retractable thereby to the position indicated by the dashed lines in FIG. 1.

Contact switches 18 and 41 are positioned within the path of travel of the lead screw guide in the manner shown and closed by abutment of the guide therewith as the latter is moved along the lead screw. Closure of contact switch 18 completes a circuit to activate solenoid 21 to retract wire guide and contact 20 and the wire being wound to the position indicated by the dashed lines. Closure of contact switch 41, on the other hand, functions to energize the measuring circuit means of FIG. 2 by completing a circuit to apply a voltage across the input terminals thereof. It is to be noted that contact switch 41 is always positioned sufficiently distant from contact switch 18 so that the measuring circuit is never energized until wire guide and contact 20 has been retracted and an electrical contact established thereby with the wire being wound to complete the measuring circuit in the manner set forth in detail hereinbelow.

Heating element 23 is fixedly positioned in the manner shown in such location as to be immediately below the path assumed by the wire upon the retraction of the wire guide and contact 20. The heating element is included in the device of the invention to burn the insulation from the wire as the latter passes thereover to thus enable the formation of a good electrical contact between the wire and the wire guide and contact 20, and the inclusion of the resistance of the wire being wound in the measuring and control circuit of FIG. 2.

Turning now to FIG. 2, the measuring and control circuit is seen to comprise a Wheatstone bridge circuit, generally indicated at 24, and control means 25 associated therewith. Points $X_1$ and $X_2$ in the bridge circuit are electrically connected to the corresponding points $X_1$ and $X_2$ in the apparatus of FIG. 1, to thus place the resistance of the wire wound past retracted wire guide and contact 20, in the bridge circuit between apexes 26 and 27 thereof. Bridge resistor 28 is a standard resistor and adjustable to a resistance value equal to the desired value of the resistor being wound, with bridge resistor 29 consisting of a piece of wire from the same supply spool as the wire being wound and cut to a length 30 (see FIG. 1) equal to the distance between retracted wire guide and contact 20 and cutter 19. Resistor 29 is included in the bridge circuit to compensate for the resistance of the surplus length 30 of wire which extends from the point at which the wire ultimately wound on the core is terminated, i.e., cutter 19, to the point of contact with the bridge circuit, i.e., retracted wire guide and contact 20. This resistor is made necessary because the resistance of such surplus length of wire is included in, and affects the output of, the bridge circuit, but is not included in the resistance of the finished resistor as should be obvious.

The bridge circuit is further seen to include equal resistance value resistors 31 and 32, input terminals 33 and 34, and output terminals 35 and 36. The circuit details of the bridge insure that, as the resistance value in the bridge of the resistor being wound, i.e., $RX_1-X_2$, increases to become equal to the combined resistance values of adjustable resistor 28 and compensating resistor 29, the output of the bridge passes through zero with an attendant change in the polarity of output terminals 35 and 36.

Control means, indicated schematically at 25, are connected across the output terminals of the bridge and responsive to a change in the polarity thereof to activate solenoid-operated cutter 19 and sever the wire being wound upon the core to thus discontinue the winding operation. It is to this effect that such control means will preferably consist of a very fast-acting gating circuit comprising a solid state device to control a relay to perform the switching function necessary to the activation of the solenoid-operated cutter 19 at the proper time, i.e., when the resistance of the wire wound past cutter 19 has assumed the desired value.

At the initiation of a winding cycle, a piece of wire equal in length to distance 30 in FIG. 1 is cut from supply spool 5 and included in the bridge circuit as resistor 29. The resistance value of adjustable bridge resistor 28 is then established at the resistance value desired in the resistors to be wound. Bridging 12, of flat resistor core 13, is inserted between contact springs 11 in notch 9 of resistor support member 2, and the wire then drawn from the supply spool, threaded through guide 20 and cutter 19, wound around lead screw guide 17, and thence welded to the conductive resistor bridging at point 37. It is to be noted here that the position of lead screw guide 17 at the commencement of the winding operation is adjusted to be in substantial alignment with the point 37 at which the wire is welded to the conductive bridging.

The device is now ready for performing the method of the present invention and, to this end, rotation of the resistor core is effected with the result that the lead screw guide 17 will commence to move along the lead screw 16 toward contact switches 18 and 41 due to the rotation of the guide induced by the progress of the wire therearound as the wire is taken up on the core.

The winding operation continues in this manner until the lead screw guide has traveled far enough along the lead screw to abut and close contact switch 18, whereupon solenoid 21 is activated and the wire guide and contact 20 retracted to the position indicated by the dashed lines. The closure of contact switch 18 may also be utilized at this point to reduce the speed of rotation of resistor core 13 in any well-known manner to thus slow down the final stages of the winding operation, should such prove necessary or desirable. Since the wire is now guided immediately over heating element 23, the latter will function to burn the insulation therefrom, with the result that a good electrical contact is established between the now uninsulated wire and the wire guide and contact 20. Thus, the resistance of the wire being wound, i.e., $RX_1-X_2$, is placed in the bridge circuit. Abutment and closure of contact switch 41 by the lead screw guide 17 follows with resultant application of a voltage across the input terminals of the bridge.

Rotation of the core is continued until the resistance value of $RX_1-X_2$ becomes equal to the combined resistance values of R28 and R29, at which time the output of the bridge will commence to pass through zero and the polarity of bridge output terminals 35 and 36 will be reversed. The reversal of the polarity of the output terminals functions to key control means 35 responsive thereto to activate the solenoid-operated cutter 19, to thus sever the wire at this point and insure a substantial identity between the resistance value of the wire wound past the cutter 19, and ultimately on the core, and the desired resistance value as established by R28 in the bridge circuit.

At this point, all that remains to complete the finished resistor is the welding of the severed end of the wire to the core. Thence, the wound core and bridging assembly may be removed from the resistor support member, an unwound core and bridging assembly inserted therein, the position of the lead screw guide readjusted, and the winding process repeated.

Various modifications of the invention will become apparent to those skilled in the art after reading this disclosure. It is, therefore, intended that the matter contained in the foregoing description and annexed drawings be interpreted as illustrative only, and not in a limiting sense, when consideration is given to the appended claims. Thus, the invention might be used for measuring coil inductance or the conductivity of a component.

What is claimed is:

1. A method of winding coils to a predetermined magnitude of an electrical property which comprises:
   winding wire about a core;
   determining when an amount of wire has been wound about the core almost sufficient to produce the predetermined magnitude of the electrical property;
   associating a property-measuring means with said wire at a point significantly in advance of the core, in response to determination that said amount has been wound;
   measuring the magnitude of said property at said point until said predetermined magnitude is measured; and
   discontinuing the winding when the property is measured to have reached said predetermined magnitude.

2. A method of winding coils to a predetermined magnitude of an electrical property which comprises:
   advancing wire past a place for severing and then to a core;
   winding said wire about said core;
   determining when a length of wire has been advanced almost sufficient to produce the predetermined magnitude of the electrical property;

associating a property-measuring means with said wire at a point significantly in advance of said place for severing, in response to determination that said length has been advanced;

measuring the magnitude of said property at said point until a second magnitude is detected which equals the sum of said predetermined magnitude plus the magnitude which would be contributed by the length of wire between said place for severing and said point; and severing said wire at said place for severing when the property is measured to have reached said second magnitude.

3. A method according to claim 2, wherein said wire is insulated and wherein said step of associating includes contacting said wire to establish an electrical connection to said property-measuring means, further including the step, in response to said determination that said length has been advanced, of removing insulation from said advancing wire prior to the wire reaching the point where said property-measuring means is connected.

4. A method of winding coils to a predetermined ohmic value which includes the steps of:

winding insulated wire, being fed along a first path, about a core, detecting when an almost sufficient amount of wire to provide the predetermined ohmic value has been wound, deflecting the wire to a second path in response to the detection, continuously baring the fed, insulated wire in advance of the core in said second path to permit electrical contact to be made therewith, contacting the bared, fed wire with a stationary sensor to measure the ohmic value of the already wound wire, and causing the wire to be severed in advance of the core when the ohmic value is measured to have reached the predetermined ohmic value.

5. A method of winding coils having a predetermined magnitude of a selected electrical characteristic which comprises the steps of:

winding a longitudinally moving conductor about a core, connecting measuring means to said moving conductor at a point preceding said core only when almost a number of turns necessary to produce said characteristic have been wound, severing said conductor in advance of said core when said predetermined magnitude is measured by said measuring means, and continuing to wind said conductor about said core until the severed end reaches said core.

6. A method of winding on a core an electrical coil having a predetermined electrical property, which method comprises the steps of:

attaching the free end of a continuous length of conductor to said core, rotating said core both to move longitudinally said conductor toward said core, and to wind said moving conductor about said core, generating a first signal when said core has rotated a first predetermined number of times indicative of the winding of a conductor length about said core almost sufficient to produce said property, connecting, on receipt of said first signal, both said wound conductor and said moving conductor, at a point in advance of said core, into a normally de-energized circuit which measures said property, generating a second working signal when said core has rotated a predetermined number of times more than said first predetermined number of times, energizing said circuit, on receipt of said second signal, to measure said property, and severing said conductor when said property is measured, said core continuing to be rotated until the severed end of said conductor is wound about said core.

7. In a method of manufacturing electrical coils having an electrical property of a selected magnitude, said coils being comprised of a plurality of turns of conductor wound about a core, the number of which turns may be variable from core to core but which is always greater than a predetermined number of turns, the improvement which comprises the steps of:

attaching a free end of a length of said conductor to said core, rotating said core for moving said conductor and for winding said conductor about said core, contacting said moving conductor in advance of said core with a stationary electrical sensor, connecting said sensor and said free conductor end to a normally de-energized property-measuring device and then energizing said device when said predetermined number of turns have been wound, operating a conductor severing facility positioned intermediate said sensor and said core when said measuring device detects said selected property magnitude, and continuing said core rotation until said severed conductor is completely wound about said core.

References Cited

UNITED STATES PATENTS

| | | | |
|---|---|---|---|
| 2,801,806 | 8/1957 | Taylor | 29—605 X |
| 2,936,516 | 5/1960 | Adair | 29—618 |
| 3,224,691 | 12/1965 | Oram | 29—605 X |

JOHN F. CAMPBELL, Primary Examiner

J. L. CLINE, Assistant Examiner

U.S. Cl. X.R.

242—9